Oct. 14, 1969  J. ROSÁN, SR., ET AL  3,472,302
INSERT WITH PRISM LOCK PIN
Filed Dec. 11, 1967  2 Sheets-Sheet 1

INVENTORS.
JOSÉ ROSÁN, SR.
ROBERT D. WEBER
BY
ATTORNEY

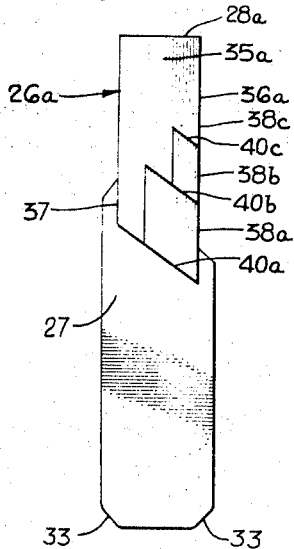
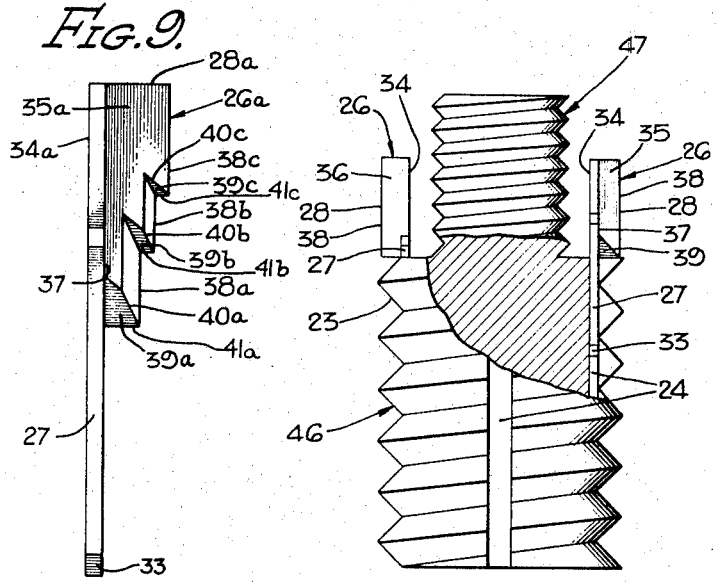
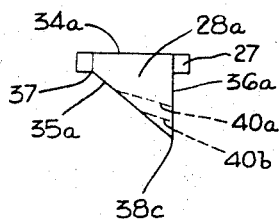
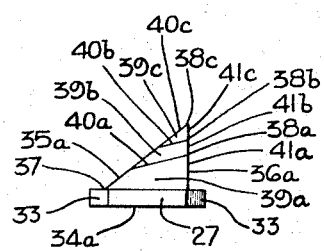
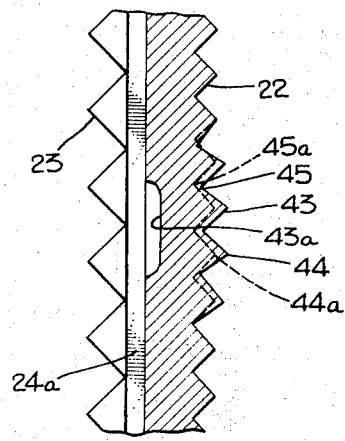

United States Patent Office 3,472,302
Patented Oct. 14, 1969

3,472,302
INSERT WITH PRISM LOCK PIN
José Rosán, Sr., Rancho San Juan, San Juan Capistrano, Calif. 92675, and Robert D. Weber, 1955 Irvine Ave., Costa Mesa, Calif. 92627
Filed Dec. 11, 1967, Ser. No. 689,644
Int. Cl. F16b 39/06
U.S. Cl. 151—23      11 Claims

ABSTRACT OF THE DISCLOSURE

This invention relates to fasteners which are lockable in workpiece bores by utilizing improved longitiudinally displaceable locking pins having a prism configuration and biplanular cutting faces to facilitate longitudinal displacement thereof and to facilitate the removal of the severed workpiece material therefrom along the biplanular and prism faces, respectively, of the locking pins.

The invention also relates to unique locking means for limiting subsequent helical displacement of a bolt or the like threaded into the fastener of the instant invention.

---

This invention relates to locking pins and more particularly to locking pins used in conjunction with threaded fasteners.

Heretofore, externally threaded fasteners capable of being installed into a cooperating bore in a workpiece and prohibited from subsequent rotational movement by axially displaced locking pins required an excessive amount of displacement force. Consequently, the pins tended to jam prior to the complete displacement thereof into their fully locked position. This caused the pins to bend resutling in the same being unsatisfactory for locking the fastener into its accommodating workpice bore.

The locking pin of the present invention overcomes these disadvantages by providing an improved means for cutting into the workpiece as the pin is axially displaced therein, thereby avoiding detrimental jamming of the pin as aforesaid.

In addition, the insert fastener of the instnat invention is provided with a new and novel means for locking a member threaded therein from helical displacement.

Accordingly, the principal object of the invention is to provide a fastener having an inexpensive locking pin with improved cutting means to eliminate jamming thereof when locking the fastener into a workpiece bore.

Another object is to provide a fastener having a locking pin provided with improved cutting means and capable of being installed and locked into place by extremely simple tools.

Still another object is to provide an insert fastener having a locking pin with an improved cutting means for locking the fastener into a workpiece bore and capable of locking a threaded element screwed therein.

Other objects and advantages of the present invention will be apparent from the following description taken in conjunction with the accompanying drawings, in which:

FIG. 8 is a front elevational view of another embodiment of the locking pin of the instant invention provided with the improved cutting means;

FIG. 9 is a side elevational view of the locking pin shown in FIG. 8;

FIG. 10 is a top plan view of the locking pin illustrated in FIG. 8;

FIG. 11 is a bottom plan view of the locking pin illustrated in FIG. 8;

FIG. 12 is an other embodiment of the invention illustrating a stud fastener provided with the locking pins having improved cutting means;

Figure 1:
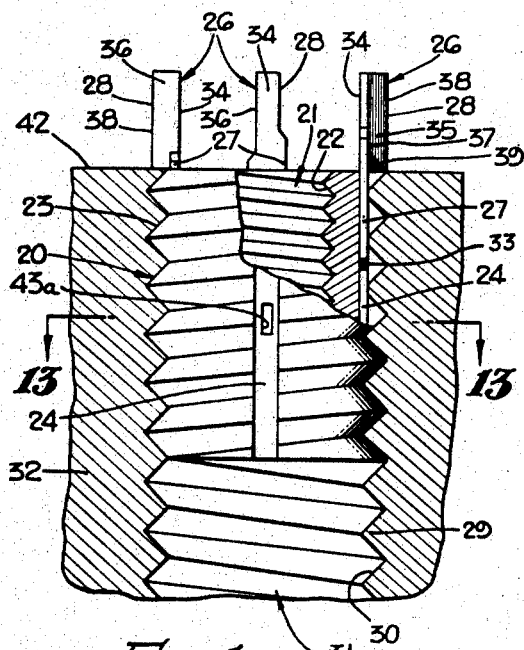
FIG. 1 is a side elevational view, partly sectioned, of an insert fastened threaded into a workpiece bore showing a plurality of locking pins of the invention positioned prior to being displaced downwardly into locking engagement with the threads of the workpiece bore.

FIG. 13 is a fragmented cross-sectional view of the insert fastener of FIG. 1 taken on line 13—13 thereof, illustrating the internal locking means for locking an element threaded therein; and FIG. 14 is a greatly enlarged fragmented section of the insert fastener illustrated in FIG. 13 taken on line 14—14 thereof, showing another view of the internal locking means for locking a threaded element threaded into the insert.

Figure 3:
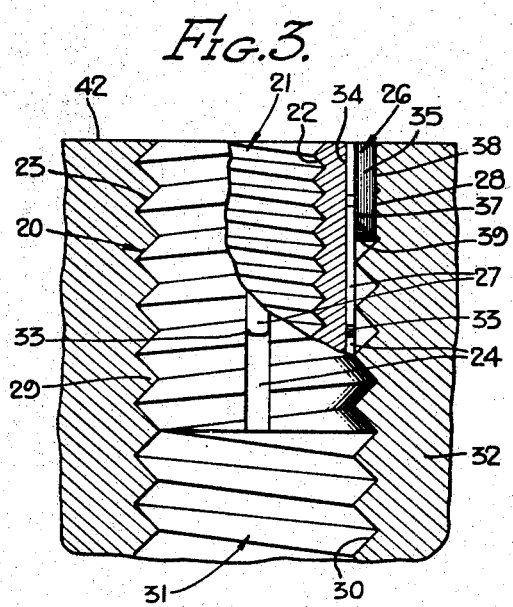
FIG. 3 is a side elevational view, partly sectioned, of the insert shown in FIG. 1 illustrating the locking pins displaced downwardly into locking engagement with the workpiece bore threads.
Figure 2:
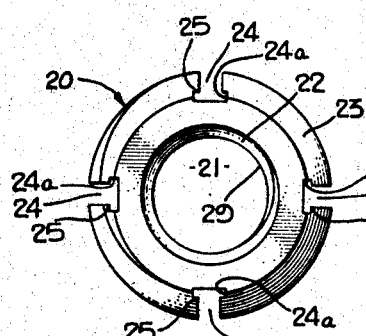
FIG. 2 is a top plan view of the insert fastener body of FIG. 1 except that it is not threaded into the workpiece bore and does not include the locking pins of the instant invention.
Figure 4:
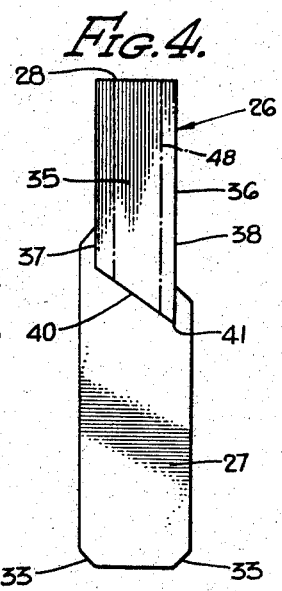
FIG. 4 is a front elevational view of the locking pin of the intsant invention provided with the improved cutting means.
Figure 5:
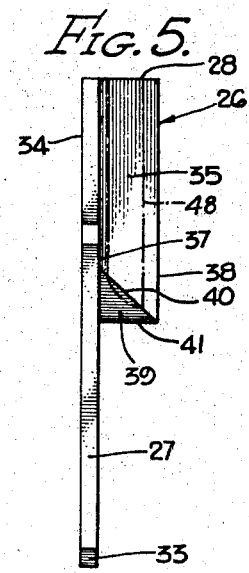
FIG. 5 is a side elevational view of the locking pin shown in FIG. 4.
Figure 6:
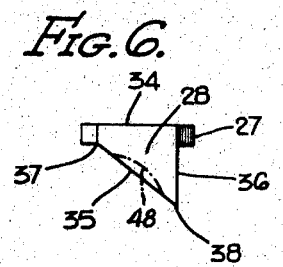
FIG. 6 is a top plan view of the locking pin illustrated in FIG. 4.
Figure 7:
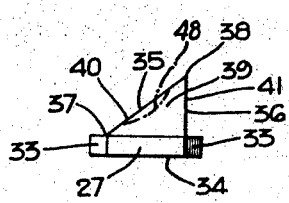
FIG. 7 is a bottom plan view of the locking pin illustrated in FIG. 4.

Referring more particularly to FIG. 1-3, reference numeral indicates generally an insert fastener provided with an internal bore 21 and a continuous internal thread 22. About the exterior of insert fastener 20 is an external thread 23 through which longitudinally extend grooves 24 provided with longitudinal shoulders 25 and an expanded portion 24a (as best seen in FIG. 2).

Locking pins 26 have a longitudinaly extending guide portion 27 and a prism shaped cutting portion 28. It should be noted that guide portions 27 of locking pins 26 have a width greater than the cutting portions 28 thereof. The extra width of the guide portion 27 is accommodated in the expanded portion 24a of groove 24 and in snug engagement therewith so that prior to longitudinally displacing locking pins 26 into their locking position (see FIG. 1) the guide portions 27 thereof are maintained in the expanded portion 24a of longitudinal grooves 24 due to frictional force. Shoulders 25 prohibit lateral movement of the locking pins 26 and guide the same during the longitudinal displacement thereof into their locking position. That is, since the width of guide portion 27 is greater than the width of groove 24, but less than the width of the expanded portion 24a thereof, and since the width of cutting portion 28 of the locking pin is less than that of groove 24, the locking pin may be easily guided in a longitudinal direction without lateral movement during its displacement into locking position due to the interengagement of guide portion 27 with groove shoulders 25 and lack of interference of the cutting portion 28 of the locking pin with the fastener body during this operation.

Since the maximum radial depth of the expanded portion 24a of groove 24, as defined by shoulders 25 and the rear wall of groove 24, does not radially extend outwardly beyond crests 29 of internal thread 30 of the accommodating bore 31 of workpiece 32, and a fortiori, neither does guide portion 27, said guide portion 27 will not interfere with the aforesaid crests 29 either during the axial displacement of the locking pin or during the initial threading of the insert fastener into the workpiece prior to the dislocation of the locking pin from its nondisplaced position.

To further facilitate and insure the nonobstructed axial displacement of the locking pin during the locking process, guide portion 27 is provided with tapered portions 33. It should be noted that although four longitudinal grooves 24 provided with locking pins 26 have been illustrated, a lesser number of locking pins and accommodating longitudinal grooves may be utilized without deviating from the scope of the invention herein.

The cutting portion 28 of locking pin 26 has a prism configuration having a plurality of faces wherein the rear face 34 thereof lies substantially in the same plane as the rearward surface of guide portion 27 so as to be coextensive therewith (see FIGS. 4–7). Prism face 35 intersects the forward face of guide portion 27 at 37 and intersects prism face 36 to form apex 38. It should be noted that cutting portion 28 has a greater longitudinal length along the apex 38 than at intersection point 37 so that a cutting face 39 is produced, which has an edge 40 thereof angled with respect to a plane passing normal to the locking pin axis as well as angled relative to a plane coextensive with said axis, and edge 41 which is in a plane normal to said axis intersecting tapered edge 40 at apex 38.

Since the apex 38 of cutting portion 28 projects radially outwardly beyond crests 29 of internal threads 30 of workpiece bore 31 when the locking pins are positioned in longitudinal grooves 24 prior to the displacement of the pins, edge 41 of cutting face 39 will limit the axial displacement of the insert fastener as it is threaded into the workpiece bore 31 by coming into contact with workpiece surface 42. Thus, the fasteners of the instant invention are uniformly threaded to a constant depth in the workpiece bore.

In addition, during the axial displacement of the locking pins 26 into their operative or locking position, edge 41 which is the lead edge of cutting face 39, will sever portions of crests 29 of internal workpiece bore 31. Since the taper of the cutting face 39 is biplanar relative to the locking pin axis, only a relatively small portion thereof (i.e., cutting edge 41) is initially in contact with the crests 29 of the workpiece bore 31, thereby eliminating the necessity of a large initial penetration load at this stage. Once the initial cleavage occurs in the workpiece material (i.e., the thread crests 29), the amount of penetration load required is substantially reduced so that despite the gradually increasing contact of the cutting face 39 with the cleavage plane formed in the thread crests 29 of the workpiece bore, the over-all penetration load is substantially reduced as compared to heretofore utilized cutting edges.

Subsequent to the complete axial displacement of the locking pins 26 into the crests 29 of the internal threads 30 of workpiece bore 31, further rotation of the insert fastener is prohibited and concomitantly terminates the subsequent helical displacement of the insert fastener in either axial direction.

That is, due to the biplanar taper of cutting face 39 relative to the locking pin axis in conjunction with the taper of prism face 35 relative to face 39 of cutting portion 28, the removal of the severed workpiece material is facilitated and enhanced by conducting the severed material past the biplanular taper and prism face, thereby eliminating the detrimental accumulation of the severed material immediately preceding the cutting face 39. As aforesaid, the inability to remove the severed workpiece material which therefore accumulated was the cause of the jamming of the heretofore utilized locking pins. This problem is eliminated by the invention disclosed herein.

Insert fastener 20 may be provided with an internal locking means (see FIGS. 1, 13 and 14) comprised of an inwardly extending protrusion 43 composed of crests 44a and roots 45a which are out of alignment with the crests 44 and roots 45 of the internal thread 22 of insert fastener 20. Protrusion 43 is formed by applying a force in the back wall of longitudinal groove 24 so as to create a depression 43a therein, thereby causing the crests 44 and roots 45 of internal thread 22 opposite said depression 43a to be inwardly displaced out of their original alignment (as shown in dashed lines in FIG. 14).

Thus, upon the screwing therein of a cooperative element (not shown), such as a bolt or the like, an interference is created when the thread of said element engages protrusion 43, thereby restricting subsequent helical displacement of said element. Although only one such lock is illustrated in FIG. 1, it is understood that said internal lock may be superimposed in each longitudinal groove 24, dependent upon the torque load requirements.

Further, it should also be noted that to further facilitate the removal of the severed workpiece material, i.e., chips, a slight concavity or groove 48 (shown in phantom lines) provided on prism faces 35 and 35a (not shown) of the locking pins may be provided extending the length thereof, without deviating from the scope of the invention herein.

FIGS. 8–11 illustrate another embodiment of the locking pin 26a wherein cutting portion 28a is comprised of prism faces 34a, 35a and 36a. Prism face 35a is provided with a series of graduated cutting faces 39a, 39b and 39c which are formed and defined by tapered edges 40a, 40b and 40c, straight edges 41a, 41b and 41c and apexes 38a, 38b and 38c, respectively. In all other respects, the alternate embodiment of the locking pin is similar to that disclosed in FIGS. 4–7 and, accordingly, similar elements are shown with similar reference numerals. By providing two distinct cutting faces which successively radially extend beyond that of the first cutting face, the initial penetration load required is further reduced relative to the locking pin hereinabove disclosed, and the sustaining penetration load necessary to continue the downward displacement of the locking pin is also diminished. Although three successive graduated cutting faces are illustrated, it is of course understood that a greater or lesser number of cutting faces may be utilized without deviating from the scope of the invention herein.

FIG. 12 discloses a stud fastener 46 embodying the principles of the instant invention except that the fastener is solid, devoid of internal threads and is provided with an integral axially projecting threaded portion 47. As in FIG. 1, the locking pins 26 are shown in their inoperative position, i.e., prior to being longitudinally displaced into the crests 29 of the workpiece bore 31. The locking operation of the stud fastener 46 is similar to that of the insert fastener 20 of FIGS. 1–3.

Although the locking pins hereinabove described are illustrated with the major apex of the cutting portion on the right side thereof as one looks directly into said cutting portion, it should be noted that the major apex may be positioned on the left side of said cutting face without deviating from the scope of the invention herein.

While several embodiments of the invention have been described, it is, of course, understood that the particular embodiments of the invention herein disclosed are for illustrative purposes only.

We claim:
1. A fastener capable of securement against helical displacement, comprising:
  a cylindrical body provided with thread convolutions about the external surface thereof;
  groove means extending longitudinally through said external thread convolutions and extending laterally beyond the root diameter thereof; and
  locking pin means having a guide portion and a cutting portion temporarily rigidly secured in said groove means, said guide portion being engaged and accommodated in said groove means, said cutting portion having a prism cross-sectional configuration which extends across the pin axis, said cutting portions being provided with cutting face means lying in a plane which is simultaneously angled with respect to a plane normal to the pin axis and with respect to a plane coextensively passing through said pin axis, said cutting face means having the lead edge thereof extending laterally from said locking pin means in a plane normal to said pin axis, one apex of the prism is the outermost radially extending point thereof and is spatially offset from the center line of the pin.

2. A fastener capable of securement against helical displacement as described in claim 1, wherein said prism cross-sectional configuration is substantially a right-angled triangular prism and said cutting portion has a longitudinal length less than that of the guide portion.

3. A fastener capable of securement against helical displacement as described in claim 2, wherein said cutting face means is intersected by a longitudinal groove extending the length of the face of the triangular prism which lies in a plane angled with respect to the plane of the guide portion.

4. A fastener capable of securement against helical displacement as described in claim 1, wherein the lowermost point of said prism apex extends beyond at least one face of said cutting face means.

5. A fastener capable of securement against helical displacement as described in claim 4, wherein said cutting face means is comprised of a series of cutting faces in longitudinal spatial relationship positioned in separate planes parallel to each other and each cutting face being recessed relative to the outermost apex of the preceding cutting face.

6. A fastener capable of securement against helical displacement as described in claim 5, wherein at least one of said cutting faces is intersected by a longitudinal groove extending the length of the triangular prism face which lies in a plane angled with respect to the plane of the guide portion.

7. A fastener capable of securement against helical displacement as described in claim 5, wherein said fastener is an insert having an internal threaded bore.

8. A fastener capable of securement against helical displacement as described in claim 1, wherein said groove means has an expanded rear portion so as to form a pair of longitudinally extending retaining shoulders.

9. A fastener capable of securement against helical displacement as described in claim 8, wherein said guide portion of said locking pin has a width greater than the width of the cutting portion thereof and the portion of said guide portion which exceeds the width of said cutting portion is in retaining engagement with said longitudinal shoulders and snugly accommodated in said expanded groove portion.

10. A fastener capable of securement against helical displacement as described in claim 9, wherein a locking depression is provided in the rear wall of said groove means and the internal thread crests and roots opposite said locking depression are laterally and inwardly protruded so as to be misaligned relative to the original thread crest and root portions, thereby creating an interference lock with a bolt or the like screwed therein.

11. A fastener capable of securement against helical displacement as described in claim 9, wherein said fastener is a stud having a solid body and an internal threaded element axially extending therefrom.

References Cited
UNITED STATES PATENTS

| | | | |
|---|---|---|---|
| 573,044 | 12/1896 | Seely | 151—23 |
| 599,764 | 3/1898 | Calvert | 151—23 |
| 929,532 | 7/1909 | Armstrong | 151—23 |
| 2,855,970 | 10/1958 | Neuschotz | 151—23 |
| 3,249,141 | 5/1966 | Neuschotz | 151—23 |
| 3,270,792 | 9/1966 | Neuschotz | 151—23 |

FOREIGN PATENTS 433,810  4/1948  Italy.

MARION PARSONS, Jr., Primary Examiner